US006901225B1

(12) United States Patent
Noe

(10) Patent No.: US 6,901,225 B1
(45) Date of Patent: May 31, 2005

(54) DEVICE FOR DETECTING POLARIZATION MODE DISPERSIONS

(75) Inventor: Reinhold Noe, Paderborn (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/743,435

(22) PCT Filed: Jul. 1, 1999

(86) PCT No.: PCT/DE99/02020

§ 371 (c)(1),
(2), (4) Date: Jan. 9, 2001

(87) PCT Pub. No.: WO00/03506

PCT Pub. Date: Jan. 20, 2000

(30) Foreign Application Priority Data

Jul. 10, 1998 (DE) .......................................... 198 30 990
Sep. 11, 1998 (DE) .......................................... 198 41 755

(51) Int. Cl.[7] .............................................. H04B 10/06
(52) U.S. Cl. ......................... 398/206; 398/29; 398/65; 398/81; 398/147; 398/94
(58) Field of Search ............................. 398/29, 65, 81, 398/147, 152, 206, 209, 210, 213, 94

(56) References Cited

U.S. PATENT DOCUMENTS 5,473,457 A    12/1995   Ono .......................... 359/161
6,603,890 B2 *  8/2003   Khosravani et al. .......... 385/11

2004/0008991 A1 *  1/2004   Waarts et al. ................. 398/81

OTHER PUBLICATIONS

Takahashi, T. et al.: "Automatic Compensation Technique for Timewise Fluctuating Polarisation Mode Dispersion in In–Line Amplifier Systems" Electronics Letters, vol. 30, No. 4, pp. 348–349.
Patent Abstracts of Japan, vol. 1995, No. 11, & JP 07 231297, Aug. 29, 1995, 1 sheet.
Yoshimura, Masato et al.: "Polarization Mode Dispersion Equalization", Proceedings OEC (1994), 14E-12, pp. 258–259.
Taylor, M. G.: Improvement in Q with Low Frequency Polarization Modulation on Transoceanic EDFA Link, IEEE Photonic Technology Letters, vol. 5, No. 3, (1994), pp. 860–862.
Watley, D.A. et al.: Compensation of Polarisation–Mode Dispersion Exceeding One Bit Period Using Single High–Birefringence Fibre, Electronic Letters, vol. 35, No. 13, (1999) pp. 1094–1095.
Bergano, Neal S. et al.: "Margin Measurements in Optical Amplifier Systems", IEEE Photonic Technology Letters, vol. 5, No. 3, (1993) pp. 304–306.

* cited by examiner

Primary Examiner—Kinfe-Michael Negash
(74) Attorney, Agent, or Firm—Bell Boyd & Lloyd LLC

(57) ABSTRACT

A device is provided for detecting polarization mode dispersion of an optical data signal, wherein the device includes at least two filters, each of which is respectively followed by a power detector. A better compensation can ensue due to the combination of a large monotony range and great steepness in the employment of a number of filters.

21 Claims, 4 Drawing Sheets

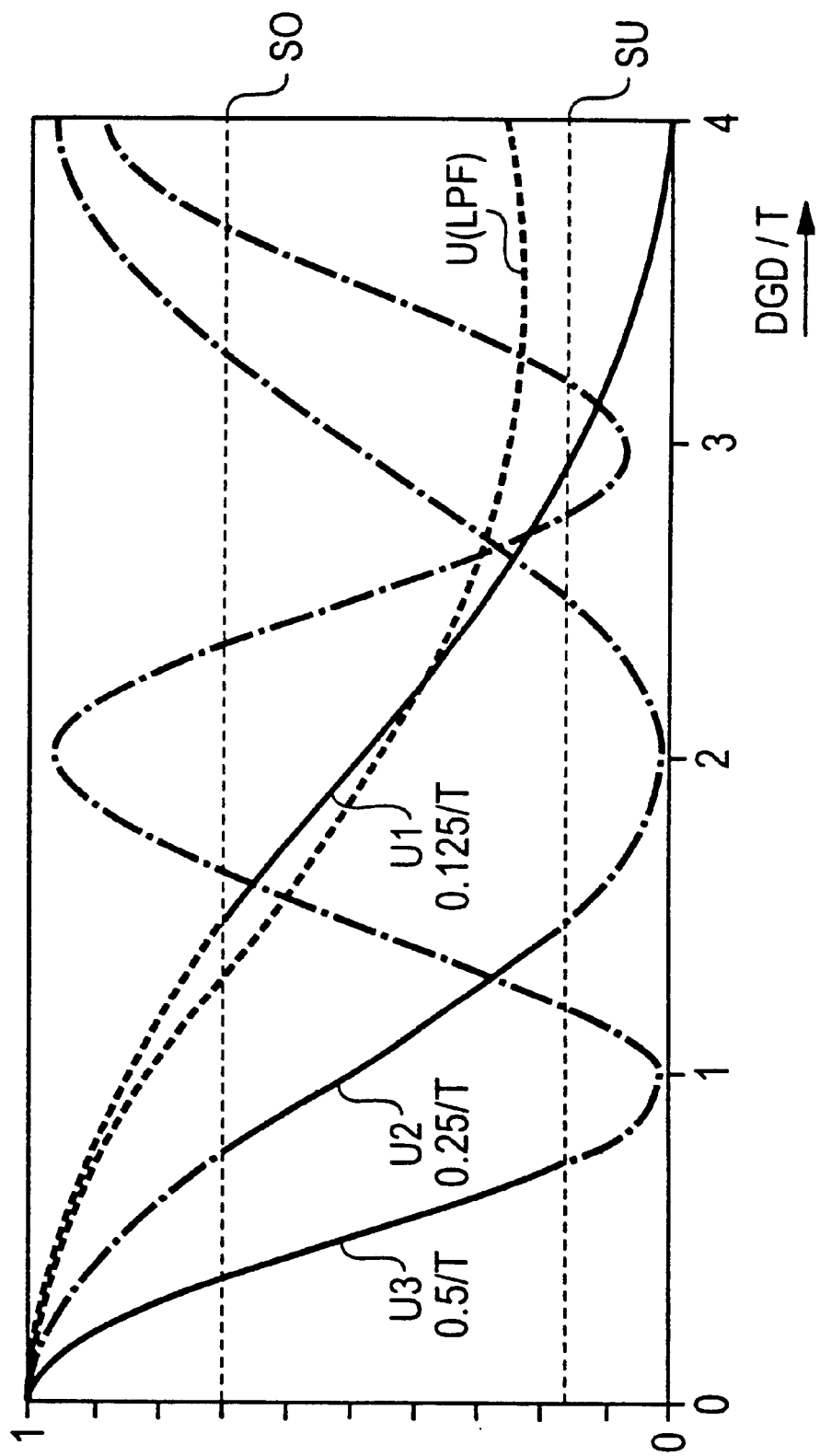

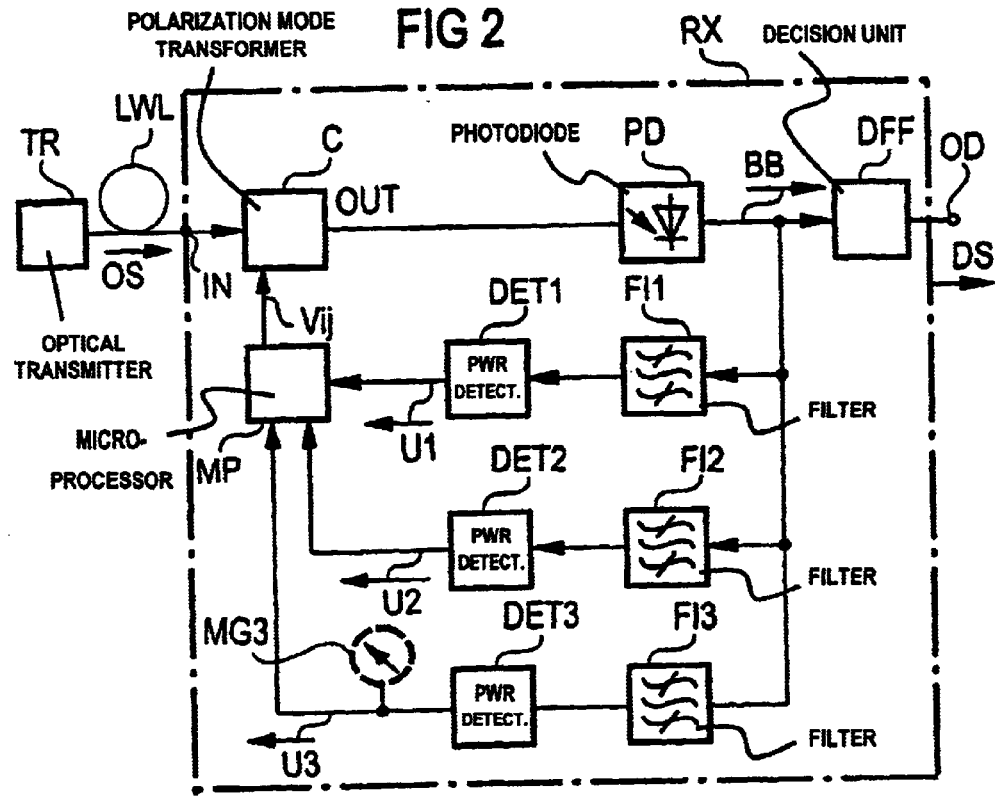
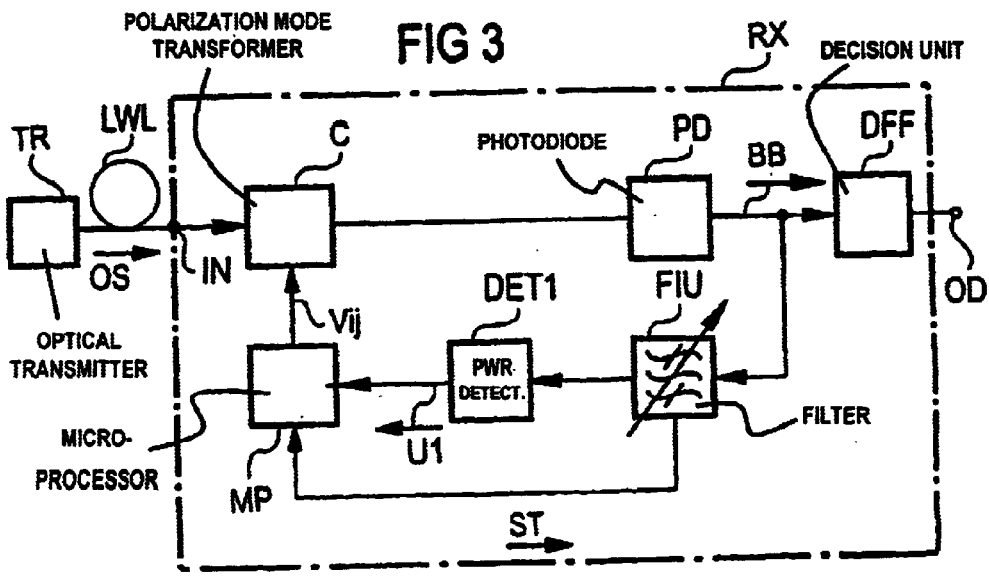

DEVICE FOR DETECTING POLARIZATION MODE DISPERSIONS

BACKGROUND OF THE INVENTION

The invention is directed to a device, for detecting polarization mode dispersion of an optical data signal, which includes a filter to whose output a power detector is connected.

Long light waveguide transmission links are utilized in optical transmission technology. The light waveguides, as a result of manufacture, are not completely isotropic but slightly birefringent. Due to the long transmission link, a frequency dependent polarization transformation occurs, which is called polarization mode dispersion (PMD) or simply polarization dispersion. This, due to modification of the polarization of the optical signal as a function of the optical frequency and associated different, frequency-dependent running times, leads to the spread of the transmitted pulses, resulting in a reduced recognizability of these pulses at the reception end and, thus, the transmitted data rate is limited.

An additional complicating factor is that the transmission behavior of the link and, thus, the PMD as well, changes due to temperature modification or mechanical stressing. Adaptive PMD compensators are therefore utilized that are inserted into the transmission path. PMD distortions must be detected in the optical receiver for the drive of these compensators. The compensator, for example, can then be optimally set with a gradient algorithm.

Electronic Letters, 17 Feb. 1994, Vol. 30, No. 4, pages 348 through 349, discloses the use of a band-pass filter for filtering a data signal whose PMD is to be detected. A power detector at the filter output supplies a signal that is higher the lower the PMD distortions are.

It is disadvantageous that, when high PMD of the first order is present, this signal does not vary monotonously as a function of the differential group delay DGD and unambiguous signals therefore can not be acquired.

Proceedings OEC 94, 14e-12, pages 258 through 259, Makuhari Fare, Japan 1994, discloses the employment of a different method in which the power of the difference signal between the decision unit output and the decision input is interpreted. This signal, however, has a lower sensitivity to PMD distortions than a suitable band filter. Moreover, false decisions can occur, particularly for great PMD distortions where the DGD exceeds the bit duration, so that the acquired signal is an unsuitable criterion in such instances for the presence of PMD distortions.

SUMMARY OF THE INVENTION

An object of the invention is to provide a reliable detector for higher values of the differential group delay. Furthermore, a suitable arrangement for the compensation of the polarization mode dispersion and for optimum setting of this detector is provided.

This object is achieved by a device for detecting polarization mode dispersion of an optical data signal, which includes: a power detector; a filter to whose output the power detector is connected; a further power detector; and a further filter to which the further power detector is connected, the power detector and the further power detector producing output voltages that are interpreted.

In a further embodiment, a device is provided for detecting polarization mode dispersion of an optical data signal, which includes: a power detector; and a filter to whose output the power detector is connected, a limit frequency of the filter or a center frequency of the filter when the filter is a band-pass filter is switchable or adjustable, where only monotony ranges of an output voltage of the filter lying between a differential group delay of between an inclusive range of 0 to a maximum of change of operational sign of the slope are interpreted, and where output voltages obtained in a preceding filter configuration are co-considered.

Advantageous developments include implementing one or more filters as a band-pass filter. The device may be constructed such that only monotony ranges of the output voltages of the filters lying between a differential group delay of between an inclusive range of 0 to the change of operational sign of the slope are interpreted. This device may be constructed such that, when an output voltage of the filter has the lowest center frequency lying below an upper threshold, the output voltage is evaluated alone. When the output voltage exceeds the upper threshold, an additional output voltage of a further filter having the next-higher center frequency is interpreted alone or additionally, and a corresponding weighting ensues for additional filters having higher center frequencies. Furthermore, center frequencies of the band-pass filters may be selected lower in stages of two proceeding from a center frequency approximately corresponding to half of a bit clock frequency. The invention may include three total filters. The inventive device may utilize a band-pass filter that is switchable in three stages. It may further include a polarization mode transformer and an optical receiver for controlling the polarization mode transformer for compensating the polarization mode dispersion. The device also may include a regulator and a measuring arrangement for measuring a bit error rate given an intentionally deteriorated reception signal or a modified threshold of a second decision unit, an error signal of the measuring arrangement additionally controlling the polarization mode transformer via the regulator. A transfer function of the filters or a weighting of the output voltage of the power detector may also be controlled via the regulator. Only one principal value of the filter may be provided for controlling the polarization mode transformer. This device may further include additional filters wherein output voltages of all or a number of the filters or output voltages of power detectors associated with respective filters within selected ranges are provided for controlling the polarization mode transformer.

A particular advantage of the invention is that the combination of output voltages of a number of filters proceeding monotonously in the principle ranges can be employed and the great steepness of the filter characteristics, which is not possible with a single band-pass filter or a single low-pass filter. This allows a significantly more exact compensation. The use of band-pass filters, as compared to the use of low-pass filters, has the advantage of greater steepness of the filter output voltages as a function of existing differential group delay. This permits implementation of an even more exact/faster compensation.

A switchable/controllable band-pass filter or a switchable/controllable low-pass filter can also be employed instead of a number of band-pass filters/low-pass filters.

The detection device can be supplemented by further control criteria. Devices that evaluate intentionally generated error rates of an auxiliary data signal that is acquired from the received, optical signal are especially advantageous. A particularly simple circuit can be achieved by a controllable sampling threshold in the evaluation of the data signal.

BRIEF DESCRIPTION OF THE FIGURES

FIG. 1 is a graph of the normed curve of the filter output voltages.

FIG. 2 is a schematic diagram showing an exemplary embodiment of the invention with three band-pass filters.

FIG. 3 is a schematic diagram showing a further exemplary embodiment with a controllable band-pass filter.

DESCRIPTION OF THE PREFERRED EMBODIMENTS

Figure 4:
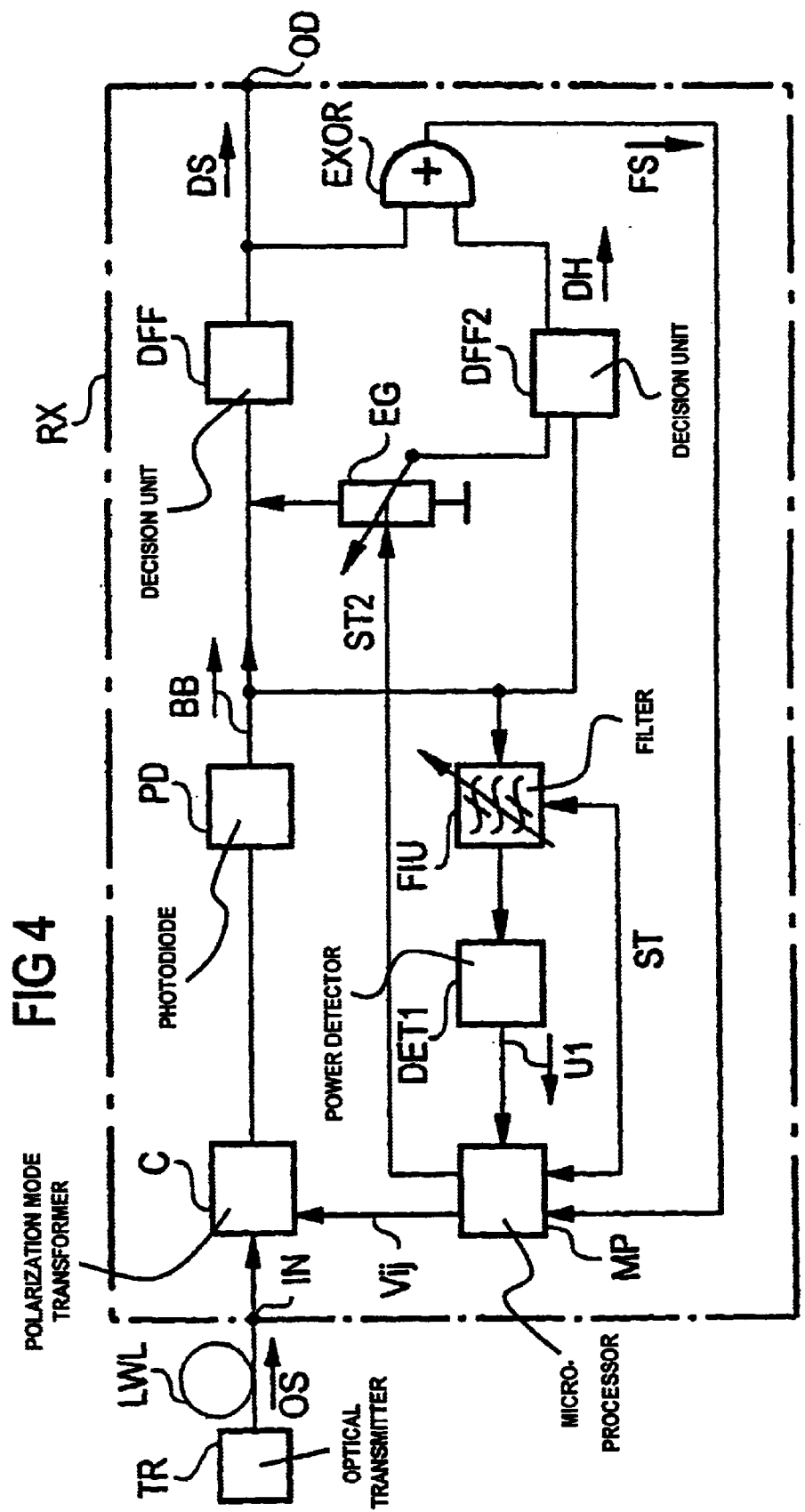
FIG. 4 is a schematic diagram showing a further exemplary embodiment with additional interpretation of an auxiliary data signal.

FIG. 1 shows the normed curve of the filter output voltages U1 through U3 of three band-pass filters whose center frequencies are 0.125/T, 0.25/T and 0.5/T, where T is the bit duration of the transmitted data signal. Moreover, the output voltage U (LPF) of a low-pass filter having the limit frequency 0.125/T is entered dependent on the normed differential group delay DGD/T for equally pronounced excitation of both principal polarizations.

Note that the two mutually orthogonal polarizations that do not change in a first approximation for a change of the optical frequency are referred to below as principal polarizations or "principal states of polarization" (PSP). The principal polarizations coincide with the principal axes in polarization-preserving light waveguides; i.e., they are horizontal and vertical. In general, the principal polarizations are arbitrary, orthogonal pairs of elliptical polarizations. The principal polarizations have different group delays whose difference is referred to as "differential group delay" (DGD) or differential group running time. When an optical signal having a principal polarization is transmitted, then no pulse spread occurs in approximation of the first order. When it is transmitted with a polarization that, for a division according to the principal polarizations, corresponds to equal power parts thereat, maximum pulse spread occurs because two equally intense pulses having delay differences of the magnitude DGD are superimposed.

When the principal polarizations change as a function of the optical frequency, then, for input-side employment of a principal polarization that corresponds to a specific frequency, the output polarization nonetheless changes as a function of the frequency, but only in an order higher than the first order. This is referred to as PMD of a higher order. In general, PMD of a higher order occurs; however, PMD of the first order dominates due to its effects and must therefore be compensated with priority.

The output signal U3 enables an error-free detection of the PMD only up to a value of the DGD of 1 T because the slope of the function changes the operational sign for values between 1T and 2T. The analogous case applies to the output voltages of the other band-pass filters and also to those of the low-pass filter to a lesser extent.

FIG. 2 shows the employment of the device for detecting PMD in a compensator. An optical transmitter TR sends an optical signal OS via a light waveguide LWL to an optical receiver RX. The latter has a photodiode PD that converts the optical signal into an electrical signal. A following decision unit DFF outputs the transmitted data signal DS at the output OD.

The photodiode is preceded by a polarization mode transformer C for compensation of the polarization mode dispersion, its input IN being identical to the receiver input. The control criterion for the polarization mode transformer C is acquired from the baseband signal BB output by the photodiode. This is supplied to a number of filters F11 through F13 whose outputs are respectively followed by a power measuring device DET1 through DET3. As a result of smoothing capacitors or similar devices, these power measuring devices also have a smoothing or low-pass function. The band-pass filters advantageously include center frequencies of 0.125/T, 0.25/T and 0.5/T. The bandwidths amount to approximately 0.0001 times through 0.2 times the respective center frequency. Given a low bandwidth of a band-pass filter, smoothing can be largely foregone in the power measuring devices DET1 through DET3 during the course of the power measurement.

Details, such as amplifiers, have not been shown for reasons of clarity.

A graphical explanation of the setting of the compensator is best illustrated with an initial presence of a great differential delay. First, the output voltage U1 of the band-pass filter F11 (that is measured by the power measuring device) having the lowest center frequency 0.125/T is employed for optimizing the compensator setting, this being employed by a microprocessor (with an A/D and a D/A converter) employed as regulator MP. As soon as this signal upwardly exceeds a threshold SO (an upper threshold in FIG. 1), the output signal of the band-pass filter F12 having the next-higher center frequency 0.25/T is employed for optimizing the output signal. When this also supplies too strong of an output signal that exceeds the threshold (or a different threshold selected in conformity with the embodiment), a switch is made to the band-pass filter having the highest center frequency 0.5/T. Although this has the smallest monotony range of the output signal, the co-evaluation of the output signals of the other band-pass filters assures that it supplies output signals in the first monotony range 0<_DGD<_T. Its high sensitivity therefore can be advantageously utilized for the compensation of the PMD distortions. The monotony ranges that are employed are shown with solid lines in FIG. 1 as principal values.

In order to achieve an optimum bit error rate, a non-linear or linear combination of the band-pass filter output signals or, respectively, of the output signals of the following power detectors can also be undertaken. To this end, the output signal or signals of the lower-frequency signals are simply co-employed instead of the filter output signals selected as a function of the output signals of the lower-frequency band-pass filters (insofar as the output signal of DET1 has not exceeded its threshold, only this is employed). When the threshold has been exceeded, then the output signal of DET2 is also added. Finally, when this further threshold has been exceeded, the output signal of DET3 is added.

For measuring purposes, measuring devices can be directly connected to the outputs of the detectors DET1 through DET3 (see, e.g., one measuring device MG3 shown in FIG. 2).

FIG. 3 shows a version of the detection device in which the three band-pass filters are replaced by a single switchable/controllable band-pass filter FIU. The procedure in the compensation remains the same. The microprocessor regulator MP respectively takes note of the preceding output voltages, so that an allocation of the principal values (monotony ranges) of the filters with higher center frequencies is unambiguously possible. The setting of the filter ensues with a control signal ST.

FIG. 4 shows a further version of the detection device in which a second decision unit DFF2 is employed, which is likewise supplied with the baseband signal BB. In this exemplary embodiment, the threshold of the decision unit is adjustable to such an extent via a setting mechanism EG that this already supplies an error-effected auxiliary data signal DH when the first decision unit DFF still outputs an essentially error-free data signal DS. The output signals are compared to one another in an exclusive-OR gate EXOR, and the error signal FS acquired in this way is likewise employed by the microprocessor MP for controlling the polarization mode transformer C. By shifting the threshold of the second decision unit, a criterion is constantly developed for how good the signal quality is in view of an obtainable bit error rate. The signal quality is inversely proportional to the error rate of the auxiliary data signal for a shift of the threshold from the optimum. A maximum output of the switchable/controllable filter FIU and a minimum error rate will roughly coincide. A more exact evaluation, which leads to a lower bit error rate of the decision unit DFF, in contrast, derives given employment of the error signal FS. Since deviations of the auxiliary data signal DH from the data signal DS, however, occur stochastically, a relatively long measuring or averaging time for the error signal FS is required in order to acquire an especially good signal-to-noise ratio and, thus, an optimum compensation. The additional information acquired with the assistance of the second decision unit is utilized for optimizing the filter FIU; i.e., for modifying its transfer function. This adaptive operation seems especially beneficial in order to make it possible to compensate unit scatters, temperature fluctuations, the occurrence of non-linear effects, etc. The great advantage of these embodiments is that a fast compensation is already possible on the basis of the filter output signal, and adequate time is available for the fine adjustment and the setting of the transfer function of the filter.

The employment of only one error signal FS is also possible, however, particularly in instances in which a fast setting of the polarization mode transformer C is not concerned so that the filter FIU and the power detector DET1 in FIG. 4 can be eliminated.

Figure 5:
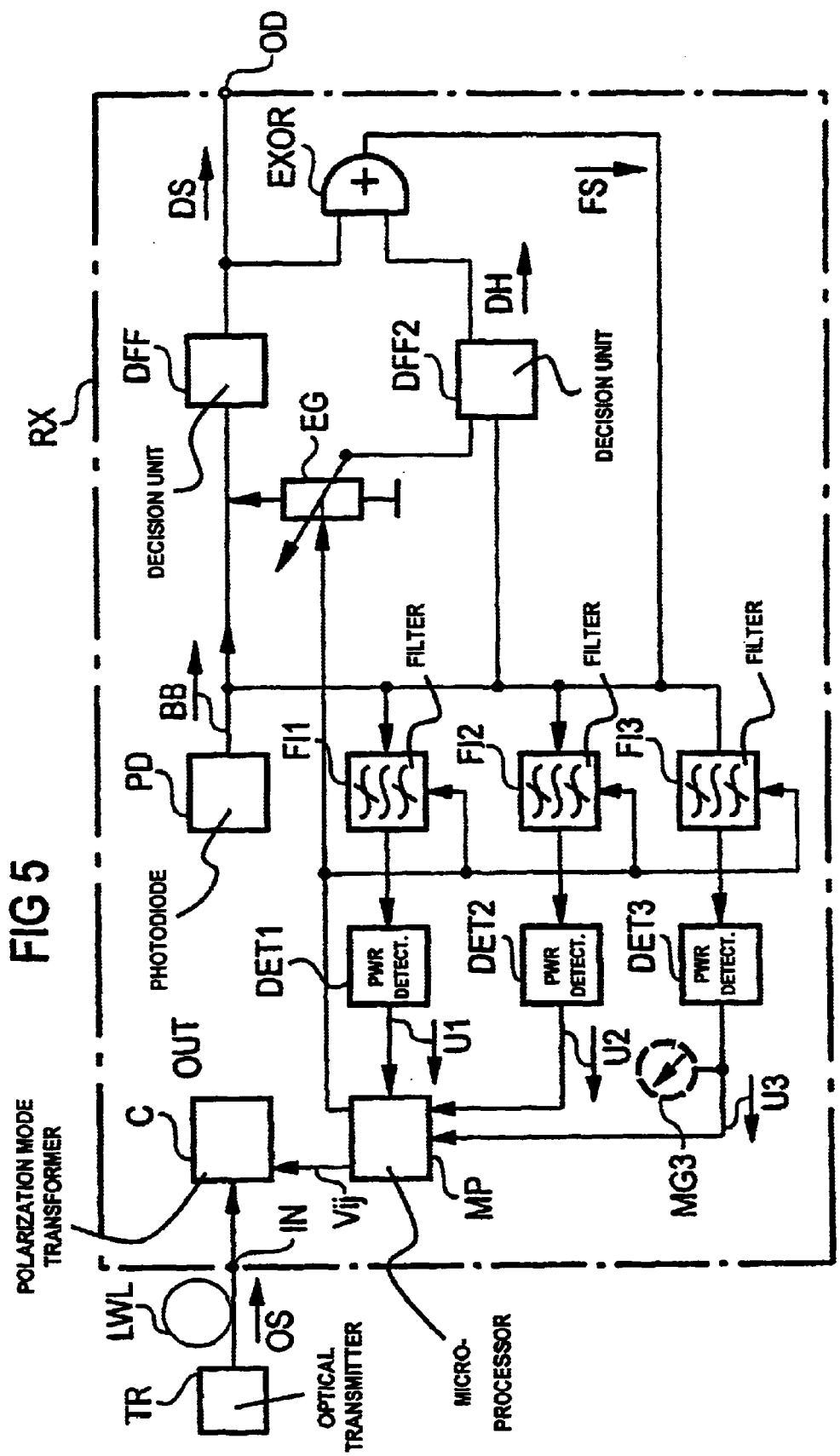
FIG. 5 is a schematic diagram showing a further version of the exemplary embodiment from FIG. 4.

For use of a number of band-pass filters, as shown in FIG. 5, the transfer functions of the filters or the weightings of the individual filter output signals can be modified such that the lowest PMD distortions occur. Since this can ensue slowly, whereas the filter output signals and their combination are quickly available, the same advantages as in the exemplary embodiment of FIG. 4 derive as a result of this adaptive operation.

Fundamentally, the control of the polarization mode transformer can also ensue with the error signal.

The above-described device is illustrative of the principles of the present invention. Numerous modifications and adaptations thereof will be readily apparent to those skilled in this art without departing from the spirit and scope of the present invention.

What is claimed is:

1. A device for detecting polarization mode dispersion of an optical signal in a receiver, wherein the receiver includes a polarization mode dispersion compensator and a photo detector connected in series for demodulating the optical signal into an electrical signal, the device comprising:

a first filter connected to an output of the photo detector;

at least one further filter connected to the output of the photo detector, the at least one further filter being a band-pass filter and having a center frequency which is higher than one of a center frequency of the first filter if the first filter is a band-pass filter and a cut-off frequency of the first filter if the first filter is a low-pass filter;

a first power detector connected to an output of the first filter for producing a first output voltage as a function of a differential group delay of the optical signal; and at least one further powered detector connected to an output of the at least one further filter for producing at least one further output voltage as a function of the differential group delay of the optical signal;

wherein only monotony ranges of the first output voltage and the at least one further output voltage, which lie in a range of the differential group delay between 0 and a change of operational sign of a slope of the respective first output voltage and the at least one further output voltage, are employed for controlling the polarization mode dispersion compensator.

2. A device for detecting polarization mode dispersion of an optical signal as claimed in claim 1, wherein the first filter is a band-pass filter.

3. A device for detecting polarization mode dispersion of an optical signal as claimed in claim 2, wherein:

when the first output voltage has a lowest center frequency lying below an upper threshold, the first output voltage is interpreted alone;

when the first output voltage exceeds the upper threshold, an additional output voltage associated with one of the at least one further filter having a next-higher center frequency is one of interpreted alone and interpreted in addition to the first output voltage; and a corresponding weighting occurs for additional filters having higher center frequencies.

4. A device for detecting polarization mode dispersion of an optical signal as claimed in claim 3, wherein the center frequencies of the band-pass filters are selected lower in stages of two proceeding from a center frequency substantially corresponding to half of a bit clock frequency.

5. A device for detecting polarization mode dispersion of an optical signal as claimed in claim 1, wherein three total filters are provided.

6. A device for detecting polarization mode dispersion of an optical signal as claimed in claim 1, further comprising an optical receiver for controlling a polarization mode transformer for compensating the polarization mode dispersion.

7. A device for detecting polarization mode dispersion of an optical signal as claimed in claim 6, further comprising:

a regulator; and a measuring arrangement for measuring a bit error rate given one of an intentionally deteriorated reception signal and a modified threshold of a second decision unit, wherein an error signal of the measuring arrangement additionally controls the polarization mode transformer via the regulator.

8. A device for detecting polarization mode dispersion of an optical signal as claimed in claim 7, wherein a transfer function of the filters is also controlled via the regulator.

9. A device for detecting polarization mode dispersion of an optical signal as claimed in claim 7, wherein a weighting of the output voltages of the power detectors is also controlled via the regulator.

10. A device for detecting polarization mode dispersion of an optical signal as claimed in claim 6, wherein only one principle value of a filter is provided for controlling the polarization mode transformer.

11. A device for detecting polarization mode dispersion of an optical signal as claimed in claim 6, further comprising a plurality of additional filters wherein output voltages of at least some of the plurality of additional filters are provided for controlling the polarization mode transformer.

12. A device for detecting polarization mode dispersion of an optical signal as claimed in claim 6, further comprising a plurality of additional filters wherein output voltages of power detectors respectively associated with at least some of the plurality of filters within selected ranges are provided for controlling the polarization mode transformer.

13. A device for detecting polarization mode dispersion on an optical signal in a receiver, wherein the receiver includes a polarization mode dispersion compensator and a photo detector connected in series for demodulating the optical signal into an electrical signal, the device comprising:
- a filter connected to an output of the photo detector, the filter being one of switchable and adjustable; and
- a power detector connected to an output of the filter for producing an output voltage as a function of a differential group delay of the optical signal;
- wherein only a monotony range of the output voltage, which lies in a range of the differential group delay between 0 and a change of operational sign of a slope of the output voltage, is employed for controlling the polarization mode dispersion compensator, and wherein output voltages of preceding filter configurations having one of a lower cut-off frequency and a lower center frequency are further employed for controlling the polarization mode dispersion compensator.

14. A device for detecting polarization mode dispersion of an optical signal as claimed in claim 13, wherein the filter is a band-pass filter which is switchable in three stages.

15. A device for detecting polarization mode dispersion of an optical signal as claimed in claim 13, further comprising:
- a polarization mode transformer; and
- an optical receiver for controlling the polarization mode transformer for compensating the polarization mode dispersion.

16. A device for detecting polarization mode dispersion of an optical signal as claimed in claim 15, further comprising:
- a regulator; and
- a measuring arrangement for measuring a bit error rate given one of an intentionally deteriorated reception signal and a modified threshold of a second decision unit, wherein an error signal of the measuring arrangement additionally controls the polarization mode transformer via the regulator.

17. A device for detecting polarization mode dispersion of an optical signal as claimed in claim 16, wherein a transfer function of the filter is also controlled via the regulator.

18. A device for detecting polarization mode dispersion of an optical signal as claimed in claim 16, wherein a weighting of the output voltage of the power detector is also controlled via the regulator.

19. A device for detecting polarization mode dispersion of an optical signal as claimed in claim 15, wherein only one principle value of the filter is provided for controlling the polarization mode transformer.

20. A device for detecting polarization mode dispersion of an optical signal as claimed in claim 15, further comprising a plurality of additional filters wherein output voltages of at least some of the plurality of additional filters are provided for controlling the polarization mode transformer.

21. A device for detecting polarization mode dispersion of an optical signal as claimed in claim 15, further comprising a plurality of additional filters wherein output voltages of power detectors respectively associated with at least some of the plurality of additional filters within selected ranges are provided for controlling the polarization mode transformer.

* * * * *